(12) United States Patent
Hu (10) Patent No.: US 10,841,553 B2
(45) Date of Patent: Nov. 17, 2020

(54) CIRCUIT FOR CONTROLLING IMAGE CAPTURING DEVICE AND ASSOCIATED CONTROL METHOD

(71) Applicant: Xiamen Sigmastar Technology Ltd., Xiamen (CN)

(72) Inventor: Chih Hau Hu, Hsinchu County (TW)

(73) Assignee: Xiamen Sigmastar Technology Ltd., Xiamen (CN)

( * ) Notice: Subject to any disclaimer, the term of this patent is extended or adjusted under 35 U.S.C. 154(b) by 28 days.

(21) Appl. No.: 16/188,420

(22) Filed: Nov. 13, 2018

(65) Prior Publication Data

US 2020/0053333 A1 Feb. 13, 2020

(30) Foreign Application Priority Data

Aug. 9, 2018 (TW) .............................. 107127740 A (51) Int. Cl.
*H04N 9/77* (2006.01)
*H04N 5/235* (2006.01)
*H04N 5/243* (2006.01)

(52) U.S. Cl.
CPC ............. *H04N 9/77* (2013.01); *H04N 5/2351* (2013.01); *H04N 5/243* (2013.01)

(58) Field of Classification Search
CPC ........ H04N 9/77; H04N 5/243; H04N 5/2351; H04N 5/332
See application file for complete search history.

(56) References Cited

U.S. PATENT DOCUMENTS

| 8,717,464 | B2 * | 5/2014 | Tang | H04N 5/23245 |
| | | | | 348/241 |
| 10,469,749 | B1 * | 11/2019 | Linzer | H04N 5/23277 |
| 2009/0190005 | A1 * | 7/2009 | Mo | H04N 5/361 |
| | | | | 348/241 |
| 2013/0322745 | A1 * | 12/2013 | Lim | H04N 9/73 |
| | | | | 382/162 |
| 2015/0296193 | A1 * | 10/2015 | Cote | H04N 9/646 |
| | | | | 382/167 |
| 2017/0132790 | A1 * | 5/2017 | Jeong | G06T 7/50 |
| 2018/0041719 | A1 * | 2/2018 | Kurata | H04N 9/083 |
| 2018/0048829 | A1 * | 2/2018 | Chan | G06K 9/4604 |
| 2018/0295336 | A1 * | 10/2018 | Chen | G02B 5/208 |
| 2019/0379848 | A1 * | 12/2019 | Berkovich | H04N 5/3692 |
| 2020/0029059 | A1 * | 1/2020 | Chahine | H04N 5/33 |

* cited by examiner

*Primary Examiner* — Dramos Kalapodas
(74) *Attorney, Agent, or Firm* — Edell, Shapiro & Finnan, LLC (57) ABSTRACT

A control method for an image capturing device is disclosed. The image capturing device includes a sensing circuit, an analog gain adjustment circuit using an analog gain, and an analog-to-digital converter (ADC). The control method includes: using a digital gain adjustment circuit to adjust, according to a digital gain, a digital image generated by the ADC to generate an adjusted digital image; generating the analog gain and the digital gain according to the digital image, and calculating intensity information of an infrared component in the digital image; and determining an image adjustment parameter according to the analog gain, the digital gain and the intensity information of the infrared component to perform image processing on the adjusted digital image.

12 Claims, 6 Drawing Sheets

CIRCUIT FOR CONTROLLING IMAGE CAPTURING DEVICE AND ASSOCIATED CONTROL METHOD

This application claims the benefit of Taiwan application Serial No. 107127740, filed Aug. 9, 2018, the subject matter of which is incorporated herein by reference.

BACKGROUND OF THE INVENTION

Field of the Invention

The invention relates to an image capturing device, and more particularly to an image capturing device having an infrared sensing element.

Description of the Related Art

In an image capturing device having an red/green/blue-infrared (RGB-IR) sensor, a dual-frequency filter and a color filter array are usually provided to allow visible and infrared light to enter the sensor, and a red component, a green component, a blue component and an infrared component of the sensed image are then determined by an internal circuit so as to further perform subsequent gain adjustment and image processing. For example, an image capturing device performs image processing on a sensed image according to intensities of a red component, a green component and a blue component of a sensed image to accordingly generate a captured image, wherein the image processing is, for example, noise cancellation, sharpness adjustment and saturation adjustment. However, an initial red component, an initial green component and an initial blue component sensed by a sensor in fact all include an infrared component, and elimination of the infrared component needs to be conducted during the calculation of the red component, green component and blue component—such elimination of the infrared component affects the image; for example, the noise intensity of the image is changed. Therefore, there is a need for a solution that estimates the influence of infrared light in an ambient environment upon a captured image, so as to accordingly perform appropriate image processing.

SUMMARY OF THE INVENTION

It is an object of the present invention to provide a circuit for controlling an image capturing device. The circuit is capable of determining at least one image processing parameter according to infrared intensity information of a captured image, so as to perform appropriate image processing on the image and to solve the issues of the prior art.

A circuit for controlling an image capturing device is disclosed according to an embodiment of the present invention. The image capturing device includes a sensing circuit, an analog gain adjustment circuit and an analog-to-digital converter (ADC). The sensing circuit provides an input image having an infrared component. The analog gain adjustment circuit adjusts the input image according to an analog gain to generate an adjusted input image. The ADC performs analog-to-digital conversion on the adjusted input signal to generate digital image data. The circuit includes a digital gain adjustment, a calculation and control circuit, a look-up table (LUT) circuit and an image processing circuit. In the operation of the circuit, the digital gain adjustment circuit adjusts the digital image data according to an analog gain to generate adjusted digital image data. The calculation and control circuit generates the analog gain and the digital gain according to the digital image data, and calculates intensity information of the infrared component. The LUT circuit, coupled to the calculation and control circuit, determines an image adjustment parameter according to the analog gain, the digital gain and the intensity information of the infrared component. The image processing circuit, coupled to the digital gain adjustment circuit and the LUT circuit, performs image processing on the adjusted digital image data according to the image adjustment parameter to generate output image data.

A control method for an image capturing device is disclosed according to another embodiment of the present invention. The image capturing device includes a sensing circuit, an analog gain adjustment circuit and an analog-to-digital converter (ADC). The sensing circuit provides an input image having an infrared component. The analog gain adjustment circuit adjusts the input image according to an analog again to generate an adjusted input image. The ADC performs analog-to-digital conversion on the adjusted input image to generate digital image data. The control method includes: using a digital gain adjustment circuit to adjust the digital image data according to a digital gain to generate adjusted digital image data; generating the analog gain and the digital gain according to the digital image data, and calculating intensity information of the infrared component; determining an image adjustment parameter according to the analog gain, the digital gain and the intensity information of the infrared component; and performing image processing on the adjusted digital image data according to the image adjustment parameter to generate output image data.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
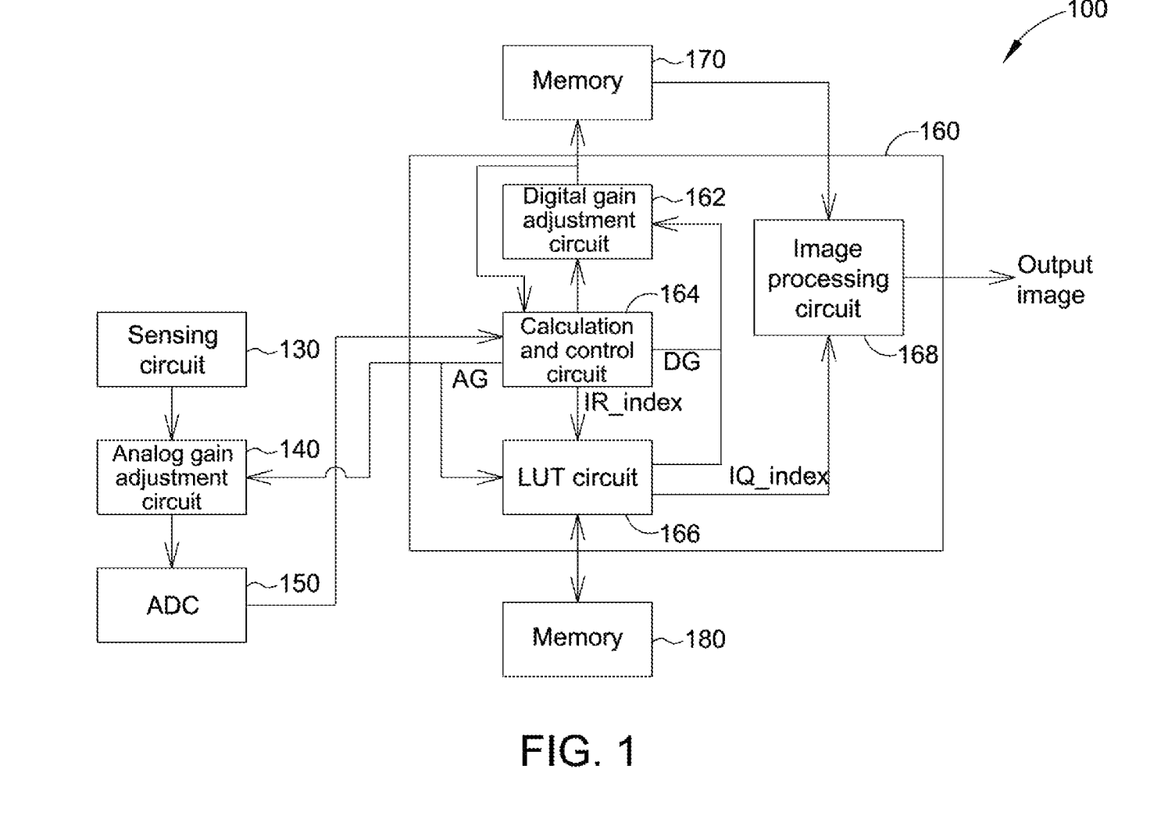
FIG. 1 is a block diagram of a circuit applied to an image capturing device according to an embodiment of the present invention.

FIG. 1 shows a block diagram of a circuit 160 applied to an image capturing device 100 according to an embodiment of the present invention. As shown in FIG. 1, the image capturing device 100 includes a sensing circuit 130, an analog gain adjustment circuit 140, an analog-to-digital converter (ADC) 150, a circuit 160 and two memories 170 and 180. The circuit 160 includes a digital gain adjustment circuit 162, a calculation and control circuit 164, a look-up table (LUT) circuit 166 and an image processing circuit 168. In this embodiment, the image capturing device 100 may be a network monitoring device or any other camera devices capable of image capturing, and may further include an infrared light source that is activated under insufficient environment light so as to allow the image capturing device 100 to successfully capture image data. Further, although two memories 170 and 180 are depicted in this embodiment for illustration purposes, a person skilled in the art can understand that the memories 170 and 180 can be implemented by the same memory in practice.

In the operation of the image capturing device 100, a color filter (not shown) can be used to perform color filter on environment light, and the sensing circuit 130 is then used to perform sensing to generate an input image. More specifically, the color filter has multiple pixels, each of which includes a red region, a green region, a blue region and an infrared region. Thus, the sensing circuit 130 can sense intensities of red light, green light, blue light and infrared light included in each pixel to generate the input image. However, due to the fact that the red region, the green region and the blue region on the color filter allow infrared light to pass through, in this embodiment, four sets of data sensed by the sensing circuit 130 for each pixel is actually the intensity of red light plus the intensity of infrared light, the intensity of green light plus the intensity of infrared light, the intensity of blue light plus the intensity of infrared light, and the intensity of only infrared light. The analog gain adjustment circuit 140 then adjusts the intensity of the input image according to an analog gain AG provided by the calculation and control circuit 164 to perform analog-to-digital conversion to generate digital image data.

The calculation and control circuit 164 in the circuit 160 receives the digital image data from the ADC 150, and calculates red component data, green component data, blue component data and an infrared intensity index IR_index in the digital image data. The data of the color components are, for example, an average intensity of light in a specific color corresponding to all pixels or pixels of a specific region; the red component data, the green component data and the blue component data is provided to the digital gain adjustment circuit 162 so as to perform digital gain adjustment according to a digital gain DG to generate adjusted digital image data, and the adjusted digital image data is temporarily stored in the memory 170. Further, the calculation and control circuit 164 generates the analog gain AG and the digital gain DG according to the adjusted digital image data for the use of the analog again adjustment circuit 140 and the digital gain adjustment circuit 162, respectively. The calculation and control circuit 164 further provides the analog gain AG, the digital gain DG and the infrared intensity index IR_index altogether to the LUT circuit 166, so as to obtain at least one image adjustment parameter IQ_index from the memory 170. The image processing circuit 168 then obtains the adjusted digital image data from the memory 170, and uses the at least one image adjustment parameter IQ_index provided by the LUT circuit 166 to perform image processing on the adjusted digital image data to generate an output image.

Figure 2:
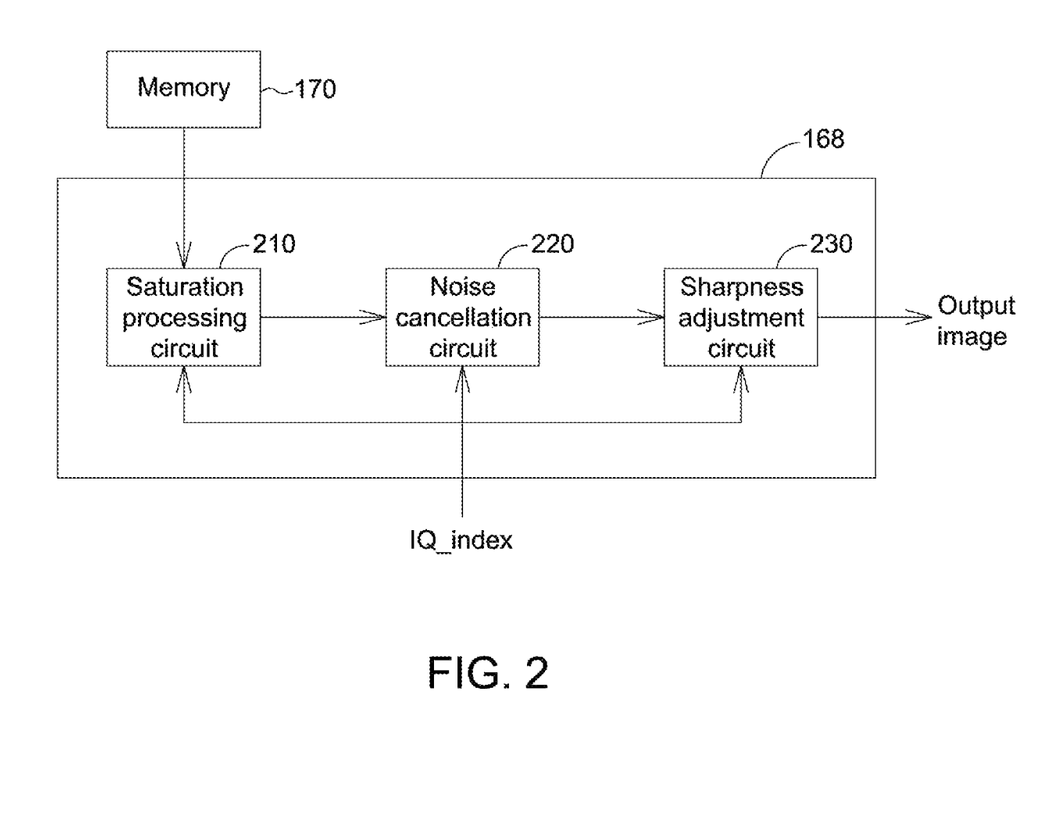
FIG. 2 is a block diagram of an image processing circuit according to an embodiment of the present invention.

FIG. 2 shows a block diagram of the image processing circuit 168 according to an embodiment of the present invention. The image processing circuit 168 includes at least one saturation processing circuit 210, a noise cancellation circuit 220 and a sharpness adjustment circuit 230. In the operation of the image processing circuit 168, the saturation processing circuit 210, the noise cancellation circuit 220 and the sharpness adjustment circuit 230 respectively perform, according to the at least one image adjustment parameter IQ_index, image processing on the adjusted digital image data obtained from the memory 170. More specifically, when the infrared intensity index IR_index indicates that the ratio of the infrared component in the input image is high, the image adjustment parameter IQ_index controls the image processing circuit 168 to apply a color setting corresponding to a high infrared component; for example, the saturation processing circuit 210 reduces the color saturation, the noise cancellation circuit 220 adopts an intense noise cancellation operation, and the sharpness adjustment circuit 230 adopts a moderate sharpness reduction. Conversely when the infrared intensity index IR_index indicates that the ratio of the infrared component in the input image is low, the image adjustment parameter IQ_index controls the image processing circuit 168 to apply a color setting corresponding to a low infrared component; for example, the saturation processing circuit 210 maintains the original color saturation, the noise cancellation circuit 220 adopts a moderate noise cancellation operation, and the sharpness adjustment circuit 230 adopts an intense sharpness reduction.

It should be noted that, the operation sequences of the saturation processing circuit 210, the noise cancellation circuit 220 and the sharpness adjustment circuit 230 are not limited to those shown in FIG. 2, and the processing circuit 168 may include other color processing circuits controlled by the adjustment parameter IQ_index.

As described above, because the image processing parameter used by the image processing circuit 168 also takes into account the infrared intensity index IR_index, the image processing circuit 168 can perform more appropriate image processing on the adjusted digital image data so as to generate output image of a better quality.

Figure 3A:
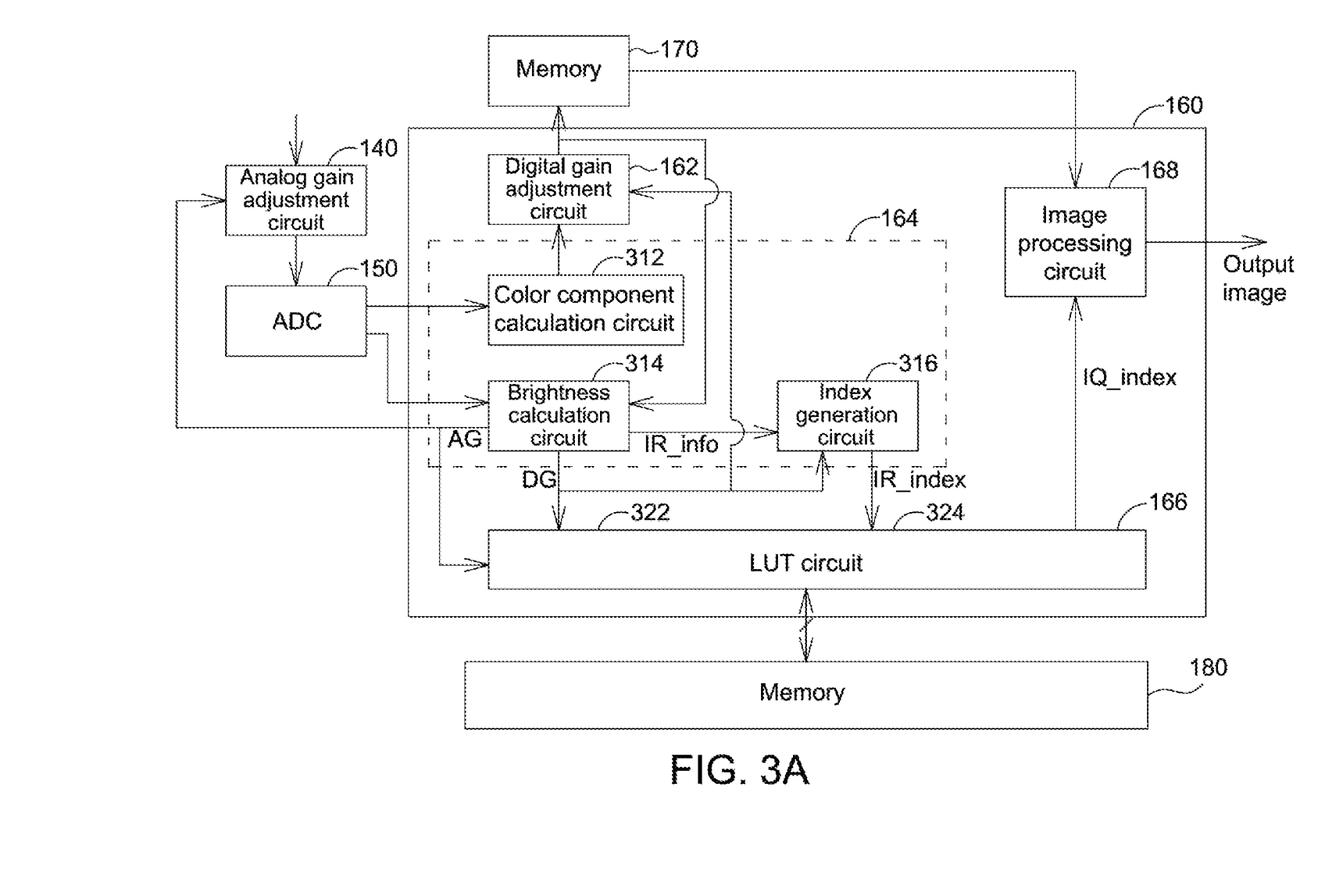
FIG. 3A is a detailed block diagram of a calculation and control circuit according to an embodiment of the present invention.
Figure 3B:
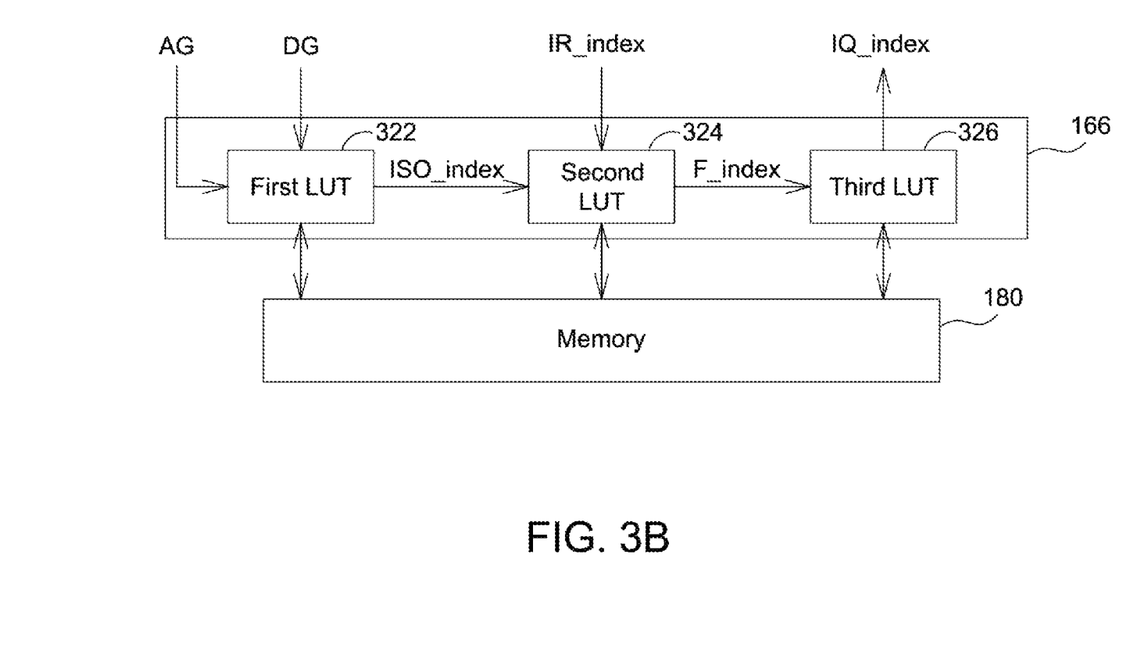
FIG. 3B is a detailed block diagram of a look-up table (LUT) circuit according to an embodiment of the present invention.
Figure 3C:
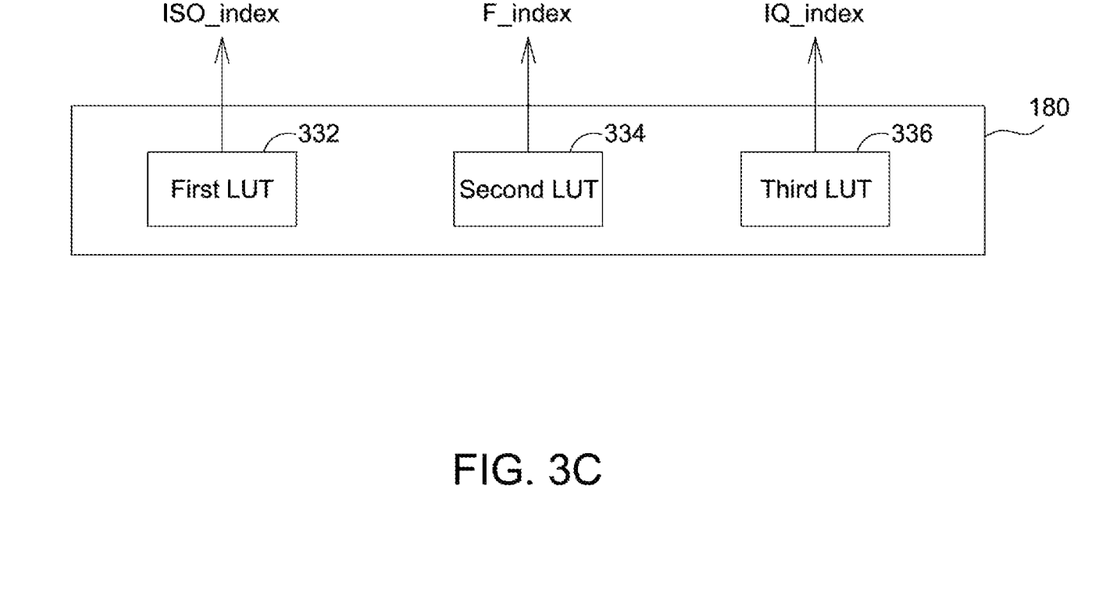
FIG. 3C is a block diagram of multiple look-up tables included in a memory according to an embodiment of the present invention.

FIG. 3A shows a detailed block diagram of the calculation and control circuit 164 according to an embodiment of the present invention. As shown in FIG. 3, the calculation and control circuit 164 includes a color component calculation circuit 312, a brightness calculation circuit 314 and an index generation circuit 316. Further, in this embodiment, as shown in FIG. 3B and FIG. 3C, the LUT circuit 166 includes a first LUT circuit 322, a second LUT circuit 324 and a third LUT circuit 326 for respectively looking up a first LUT 322, a second LUT 334 and a third LUT 336 stored in the memory 180 shown in FIG. 3C. However, the above example is for illustration purposes, and a person skilled in the art can understand the first LUT circuit 322, the second LUT circuit 324 and the third LUT circuit 326 can share the same LUT circuit to look up multiple LUTs stored in the memory 180. In the embodiment shown in FIG. 3, the color component calculation circuit 312 receives the digital image data from the ADC 150. In the digital image data, each pixel includes four sets of information, which is three sets of color information including the intensity of red light plus the intensity of infrared light, the intensity of green light plus the intensity of infrared light, and the intensity of blue light plus the intensity of infrared light, and one set of infrared light information including the intensity of infrared light. The color component calculation circuit 312 subtracts the infrared information each of the three sets of color information to obtain red component data, green component data and blue component data, and transmits the red component data, the green component data and the blue component data to the digital gain adjustment circuit 162 for gain adjustment so as to obtain the adjusted digital image data. The brightness calculation circuit 314 receives the adjusted digital image data from the digital gain adjustment circuit 162, and receives the infrared information (i.e., the intensity of infrared light of each pixel) in the digital image data from the ADC 150, so as to determine the analog gain AG, the digital gain DG and intensity information IR_info of the infrared component. In this embodiment, as an image indicated by the adjusted digital image data gets darker, the larger the analog again AG and the digital gain DG are, and the intensity information IR_info of the infrared component may be an average of the infrared component data (i.e., the infrared information) corresponding to multiple pixels in the digital image data. Next, the index generation circuit 316 determines the infrared intensity index IR_index according to the intensity information IR_info of the infrared component and the digital gain DG to determine the infrared intensity index IR_index, wherein the infrared intensity index IR_index indicates the intensity of infrared light in the input image.

In this embodiment, the brightness calculation circuit 314 determines the updated analog gain AG and the updated digital gain DG according to the adjusted digital image data. However, as the digital gain DG used in the digital gain adjustment circuit 162 is determined by the brightness calculation circuit 314, the brightness calculation circuit 314 can also determine the updated analog gain AG and the updated digital gain DG according to the output of the color component calculation circuit 312. Further, the brightness calculation circuit 314 can also calculate the red component data, the green component data and the blue component data according to the digital image data, and as previously described, the digital gain DG used is determined by the brightness calculation circuit 314. Thus, in another embodiment, the brightness calculation circuit 314 can calculate the updated analog gain AG and the updated digital gain DG directly according to the digital image data, instead of calculating the updated analog gain AG and the updated digital gain DG according to the output of the color component calculation circuit 312 or the digital gain adjustment circuit 162.

In the operation of the LUT circuit 166, the first LUT circuit 322 obtains a gain index ISO_index from the first LUT 322 according to the analog gain AG and the digital gain DG, wherein the gain index ISO_index represents the level of gain applied to the input image. The second LUT circuit 322 obtains a final index F_index from the second LUT 334 according to the gain index ISO_index and the infrared intensity index IR_index, wherein the final index F_index is for indicating at least one specific image adjustment parameter IQ_index. The third LUT 326 then obtains the at least one image adjustment parameter IQ_index from the third LUT 336 according to the final index F_index and provides the at least one image adjustment parameter IQ_index to the image processing circuit 168 for further use. It should be noted that, in other embodiments, the first LUT circuit 322 can be substituted directly by a gain index calculation circuit (not shown), for example, the analog gain AG and the digital gain DG are directly multiplied to obtain the gain index ISO_index, thus omitting the LUT step and the step of storing the first LUT 322 to the memory 180. Further, in other embodiments, the second LUT and the third LUT can be integrated, such that the second LUT circuit 322 can directly obtain the at least one image adjustment parameter IQ index by means of LUT and the third LUT circuit 326 can be omitted.

When the same level of gain is applied, the noise generated from gain applied by the analog gain adjustment circuit 140 is lower than that generated from gain applied by the digital gain adjustment circuit 162. Thus, in this embodiment, the analog gain adjustment circuit 140 has a higher priority to be used than the digital gain adjustment circuit 162 (that is, the digital gain DG is equal to 1), so as to reduce the overall noise. However, since the infrared component data is removed from the adjusted digital image data by the color component calculation circuit 312, the brightness calculation circuit 314 may need to adopt a greater level of gain if the infrared component in the environment light is large. At this point, if a higher level of gain is applied by only the analog gain adjustment circuit 140, an issue of over-exposure may be likely caused.

More specifically, due to an upper limit of brightness of the adjusted input image and the infrared component data is not removed from the input image, once the gain adjustment circuit 140 adopts an overly high level of gain, pixels at some brighter areas in the input image can reach a maximum pixel value in a way that these pixels cannot be identified. In view of such issue, in this embodiment, when the infrared component in the environment light is large, the digital gain adjustment circuit 162 is still needed to perform gain adjustment (that is, the digital gain DG is greater than 1) on the red component data, the green component data and the blue component data. For example, assume that the current analog gain AG is "9", the current digital gain DG is "1", the average values of red, green and blue component data are "10", the average pixel value of infrared light is "200", a target average pixel value is "40" and a maximum pixel value is "255". At this point, to have the brightness value of processed digital image data reach the target average pixel value "40", the current pixel value (the average pixel value "10") needs to be increased to four times in order to reach the target average pixel value "40". At this point, the analog gain AG can be increased from "9" to only "(9*(255/200))", that is, the pixel value is increased to (255/200) times. Thus, the digital gain DG needs to be set to "4/(255/200)" in order to increase the current pixel value to four times. It should be noted that, the above example merely describes the concept of the present invention. In practice, taking the above example for instance, the adjusted analog gain AG needs to be smaller than "(9*(255/200))". The reason is that, for each pixel, the four sets of data sensed by the sensing circuit 130 is the intensity of red light plus the intensity of infrared light, the intensity of green light plus the intensity of infrared light, the intensity of blue light plus the intensity of infrared light, and the intensity of only infrared light. As such, when the adjusted analog gain AG is equal to "(9*(255/200))", it is only ensured that the part corresponding to the infrared light of the adjusted input image does not exceed the upper limit; however, the intensity of red light plus the intensity of infrared light, and the intensity of green light plus the intensity of infrared light inevitably exceed the above upper limit.

As previously described, the digital gain DG and the intensity information IR info of the infrared component reflect the ratio of infrared light in the environment light to a certain degree. Hence, in one embodiment, the index generation circuit 316 multiplies the digital gain DG by the intensity information IR info of the infrared component (e.g., an average of the infrared component data in the digital image data) to obtain the infrared intensity index IR index; that is, IR index=DG*IR info. In the above equation, the infrared intensity information IR info can reflect the intensity of infrared light having undergone analog adjustment, and the digital gain DG can reflect the level of adjustment that needs to be performed on the red component data, the green component data and the blue component data due to the factor of infrared light. Therefore, a result of multiplying the two can be more comprehensively reflected in the level of influence of infrared light.

In another embodiment, in addition to taking the issue of over-exposure into account, the brightness calculation circuit 314 further needs to consider an upper limit of the analog gain AG that can be applied by the gain adjustment circuit 140. Taking the above example for instance, assume that the upper limit of the analog gain AG is "10", and the current pixel value (the average value "10") needs to be increased to four times. Because the analog gain AG can be increased from "9" to "10" only, that is, increasing the pixel value by (10/9) times, the digital gain DG needs to be set to "3.6" in order to increase the current pixel value to four times ((10/9)3.6=4).

Figure 4:
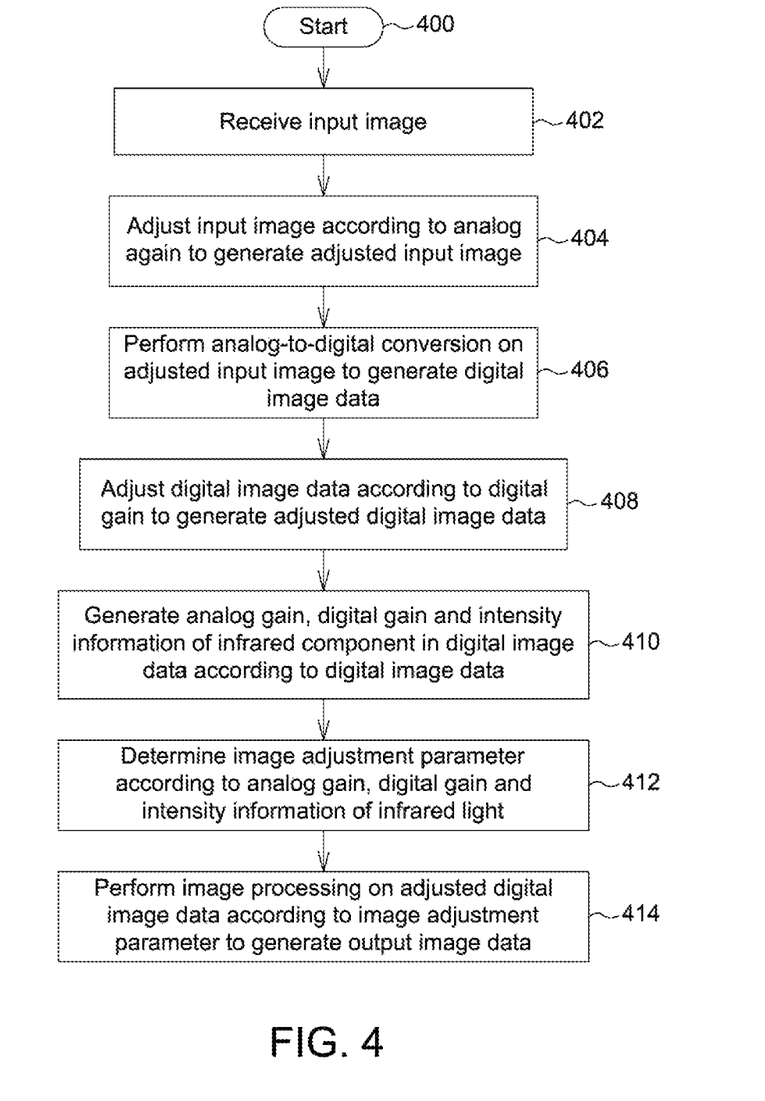
FIG. 4 is a flowchart of a control method for an image capturing device according to an embodiment of the present invention.

FIG. 4 shows a flowchart of a control method for an image capturing device according to an embodiment of the present invention. With reference to the disclosure of the above embodiments, the process of the control method includes the following steps.

In step 400, the process begins.

In step 402, an input image is received.

In step 404, the input image is adjusted according to an analog gain to generate an adjusted input image.

In step 406, analog-to-digital conversion is performed on the adjusted input image to generate digital image data.

In step 408, the digital image data is adjusted according to a digital gain to generate adjusted digital image data.

In step 410, the analog gain, the digital gain and intensity information of an infrared component in the digital image data are generated according to the digital image data.

In step 412, an image adjustment parameter is determined according to the analog gain, the digital gain and the intensity information of the infrared component.

In step 414, image processing is performed on the adjusted digital image data according to the image adjustment parameter to generate output image data.

In conclusion of the present invention, in the circuit for controlling an image capturing device and the associated control method, the infrared intensity in image data is used to determine the intensities related to noise cancellation, sharpness adjustment and color saturation adjustment in image processing. With the present invention, most appropriate processing can be performed on image data to enhance image quality. Further, although the embodiments of the present invention are described by taking an image capturing device including a red/green/blue-infrared (RBG-IR) sensor as an example, the present invention is not limited to such example. A person skilled in the art can understand that, any image capturing device including an infrared sensor but not any other color space sensors can be applied to the scope of the present invention.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded with the broadest interpretation so as to encompass all such modifications and similar arrangements and procedures.

What is claimed is:

1. A circuit for controlling an image capturing device, the image capturing device comprising a sensing circuit, an analog gain adjustment circuit and an analog-to-digital converter (ADC), the sensing circuit providing an input image having an infrared component, the analog gain adjustment circuit adjusting the input image according to an analog gain to generate an adjusted input image, the ADC performing analog-to-digital conversion on the adjusted input image to generate digital image data; the circuit comprising:
 a digital gain adjustment circuit, adjusting the digital image data according to a digital gain to generate adjusted digital image data;
 a calculation and control circuit, generating the analog gain and the digital gain according to the digital image data, and calculating intensity information of the infrared component;
 a look-up table (LUT) circuit, determining an image adjustment parameter according to the analog gain, the digital gain, and the intensity information of the infrared component; and
 an image processing circuit, performing image processing on the adjusted digital image data according to the image adjustment parameter to generate output image data,
 wherein the calculation and control circuit comprises:
 a color component calculation circuit, calculating red component data, green component data and blue component data in the digital image data, wherein the digital gain adjustment circuit performs gain adjustment on the red component data, the green component data and the blue component data to generate the adjusted digital image data; and
 a brightness calculation circuit, determining the analog gain and the digital gain according to the adjusted digital image data, and estimating the intensity information of the infrared component according to infrared component data in the digital image data,
 wherein the calculation and control circuit further comprises:
 an index generation circuit, generating an infrared intensity index according to the digital gain and the intensity information of the infrared component, wherein the infrared intensity index indicates an intensity of the infrared component in the input image;
 wherein, the LUT circuit determines the image adjustment parameter according to the analog gain, the digital gain and the infrared intensity index, and
 wherein the index generation circuit multiplies the digital gain by the intensity information of the infrared component to obtain the infrared intensity index.

2. The circuit according to claim 1, wherein the LUT circuit determines an index according to the analog gain, the digital gain, and the intensity information of the infrared component, and determines the image adjustment parameter according to the index, wherein the index indicates a ratio of the infrared component in the input image.

3. The circuit according to claim 2, wherein when the index indicates that the ratio of the infrared light in the input image is high, the image processing circuit performs intense noise cancellation, moderate sharpness adjustment or moderate color saturation adjustment on the adjusted digital image data according to the image adjustment parameter to generate the output image data.

4. The circuit according to claim 1, wherein the brightness calculation circuit calculates an average of the infrared component data in the digital image data, as the intensity information of the infrared component.

5. The circuit according to claim 1, wherein the LUT circuit comprises:
 a first LUT circuit, determining a gain index according to the analog gain and the digital gain;
 a second LUT circuit, determining a final index according to the gain index and the infrared intensity index; and a third LUT circuit, determining the image adjustment parameter according to the final index.

6. The circuit according to claim 1, wherein the brightness calculation circuit further determines the analog gain and the digital gain according to an upper limit of the analog gain.

7. A control method for an image capturing device, the image capturing device comprising a sensing circuit, an analog gain adjustment circuit and an analog-to-digital converter (ADC), the sensing circuit providing an input image having an infrared component, the analog gain adjustment circuit adjusting the input image according to an analog gain to generate an adjusted input image, the ADC performing analog-to-digital conversion on the adjusted input image to generate digital image data; the control method comprising:
using a digital gain adjustment circuit to adjust the digital image data according to a digital gain to generate adjusted digital image data;
generating the analog gain and the digital gain according to the digital image data, and calculating intensity information of the infrared component;
determining an image adjustment parameter according to the analog gain, the digital gain, and the intensity information of the infrared component; and
performing image processing on the adjusted digital image data according to the image adjustment parameter to generate output image data,
wherein the step of generating the analog gain and the digital gain according to the digital image data and calculating the intensity information of the infrared component comprises:
calculating red component data, green component data and blue component data in the digital image data, wherein the digital gain adjustment circuit performs gain adjustment on the red component data, the green component data and the blue component data to generate the adjusted digital image data, and determining the analog gain and the digital gain according to the adjusted digital image data, and
determining the intensity information of the infrared component according to infrared component data in the digital image data,
wherein the step of determining the image adjustment parameter comprises:
generating an infrared intensity index according to the digital gain and the intensity information of the infrared component, wherein the infrared intensity index indicates an intensity of the infrared component in the input image; and determining the image adjustment parameter according to the analog gain, the digital gain and the infrared intensity index, and
wherein the step of generating the index intensity index comprises: multiplying the digital gain by the intensity information of the infrared component to obtain the infrared intensity index.

8. The control method according to claim 7, wherein the step of determining the image adjustment parameter according to the analog gain, the digital gain and the intensity information of the infrared component comprises:
determining an index according to the analog gain, the digital gain, and the intensity information of the infrared component; and
determining the image adjustment parameter according to the index, wherein the index indicates a ratio of the infrared component in the input image.

9. The control method according to claim 8, wherein the step of performing image processing on the adjusted digital image data according to the image adjustment parameter to generate the output image data comprises:
when the index indicates that the ratio of the infrared component in the input image is high, performing intense noise cancellation, moderate sharpness adjustment or moderate color saturation adjustment on the adjusted digital image data according to the image adjustment parameter to generate the output image data.

10. The control method according to claim 7, wherein the step of calculating the intensity information of the infrared component according to the infrared component data in the digital image data comprises:
calculating an average of the infrared component data in the digital image data, as the intensity information of the infrared component.

11. The control method according to claim 7, wherein the step of determining the image adjustment parameter comprises:
using a first LUT circuit to determine a gain index according to the analog gain and the digital gain;
using a second LUT circuit to determine a final index according to the gain index and the infrared intensity index; and
using a third LUT circuit to determine the image adjustment parameter according to the final index.

12. The control method according to claim 7, further comprising:
determining the analog gain and the digital gain according to an upper limit of the analog gain.

* * * * *